US 6,655,621 B1

(12) United States Patent
Yuen et al.

(10) Patent No.: US 6,655,621 B1
(45) Date of Patent: Dec. 2, 2003

(54) GUIDING MECHANISM FOR A FISHING REEL

(75) Inventors: Shu-Cheong Yuen, Kwai Chung (CN); Chung Cheung, Kwai Chung (CN)

(73) Assignee: Heligear Engineering (H.K.) Company, Ltd., Kwai Chung (HK)

( * ) Notice: Subject to any disclaimer, the term of this patent is extended or adjusted under 35 U.S.C. 154(b) by 0 days.

(21) Appl. No.: 10/366,895

(22) Filed: Feb. 14, 2003

(51) Int. Cl.[7] .............................................. A01K 89/01
(52) U.S. Cl. ...................................................... 242/242
(58) Field of Search ................................ 242/241, 242, 242/277, 278, 279; 254/331, 385, 387

(56) References Cited

U.S. PATENT DOCUMENTS

| | | | | | |
|---|---|---|---|---|---|
| 4,426,045 | A | * | 1/1984 | Gifford | 242/232 |
| 5,634,628 | A | * | 6/1997 | Schuch | 254/331 |
| 5,934,586 | A | * | 8/1999 | Kang et al. | 242/241 |
| 5,984,220 | A | * | 11/1999 | Kawabe | 242/241 |
| 6,460,792 | B1 | * | 10/2002 | Morimoto et al. | 242/241 |

* cited by examiner

Primary Examiner—Emmanuel M. Marcelo
(74) Attorney, Agent, or Firm—Alix, Yale & Ristas, LLP

(57) ABSTRACT

A guiding mechanism for a fishing reel utilizing rolling elements of various forms to reduce friction and resistance in moving parts of a fishing reel. The rolling elements are generally affixed to the level wind bracket of a fishing reel to allow efficient oscillation of the shaft.

13 Claims, 6 Drawing Sheets

GUIDING MECHANISM FOR A FISHING REEL

BACKGROUND OF THE INVENTION

The present invention relates generally to fishing reels of the type having an oscillating element. More particularly, the present invention relates to mechanisms for preventing excessive frictional resistance of select parts of the oscillation mechanism.

Contained in a fishing reel are a number of moving parts which are required to move in specific directions. Many of these parts are controlled in their movement by guiding mechanisms. In the past, a number of different methods have been introduced as guiding mechanisms. However, these previous methods generate relatively large frictional resistance forces. As fishing reels become more advanced, users prefer to have reels which run smoothly and are therefore free of undo force generated by friction.

Oscillation of a level wind bracket of a fishing reel is generally accomplished in different ways. In some cases by an oscillation gear driven by a drive mechanism. A pole device generally operates between the oscillation gear and a level wind bracket transmitting and converting the rotary movement of the oscillation gear to a linear movement of the level wind bracket. In other cases, a shuttle screw may be used for the oscillation mechanism, wherein the shuttle screw is driven and rotated by a drive mechanism through the use of a closed loop groove on the shuttle screw. The shuttle screw typically goes through a hole on the level wind bracket, and there is a pole between the shuttle screw and the level wind bracket. One end of the pole interacts with the top of the shuttle screw groove. The other end of the pole is used to push the level wind bracket. When the shuttle screw is rotated, the pole transmits a rotary motion of the shuttle screw to a linear motion for the level wind bracket. In both cases, the level wind brackets is guided along the fore and aft linear pathway in order to control unnecessary movement in the oscillation mechanism. The invention may use one or more sets of guiding mechanism.

SUMMARY OF THE INVENTION

Briefly stated, the present invention in a preferred form is generally directed toward rolling elements in the guiding mechanism of fishing reels to reduce the magnitude of frictional resistance.

The guiding mechanism includes a level wind bracket, which is in operative communication with the reel driving mechanism. This operative communication allows the wind bracket to be displaced in what typically is a fore and aft linear motion. A shaft is generally mounted to the level wind bracket. The shaft has a central axis along which the shaft moves with the level wind bracket. The motion of the bracket allows for such things as the level laying of fishing line onto a spool attached to the shaft. At least one roller mount is fixed to the level wind bracket and a roller assembly is connected to the roller mount. The roller rotates about a rotational axis which is perpendicular to the central shaft.

An elongated roller runway defines at least in part a fore and aft linear pathway on which the roller makes contact during the operation of the fishing reel. The roller may in some cases overrun or be in intermittent contact with the runway.

BRIEF DESCRIPTION OF THE DRAWINGS

Other objects and advantages of the invention will be evident to one of ordinary skill in the art from the following detailed description with reference to the accompanying drawings, in which.

DETAILED DESCRIPTION OF A PREFERRED EMBODIMENT

Figure 1:
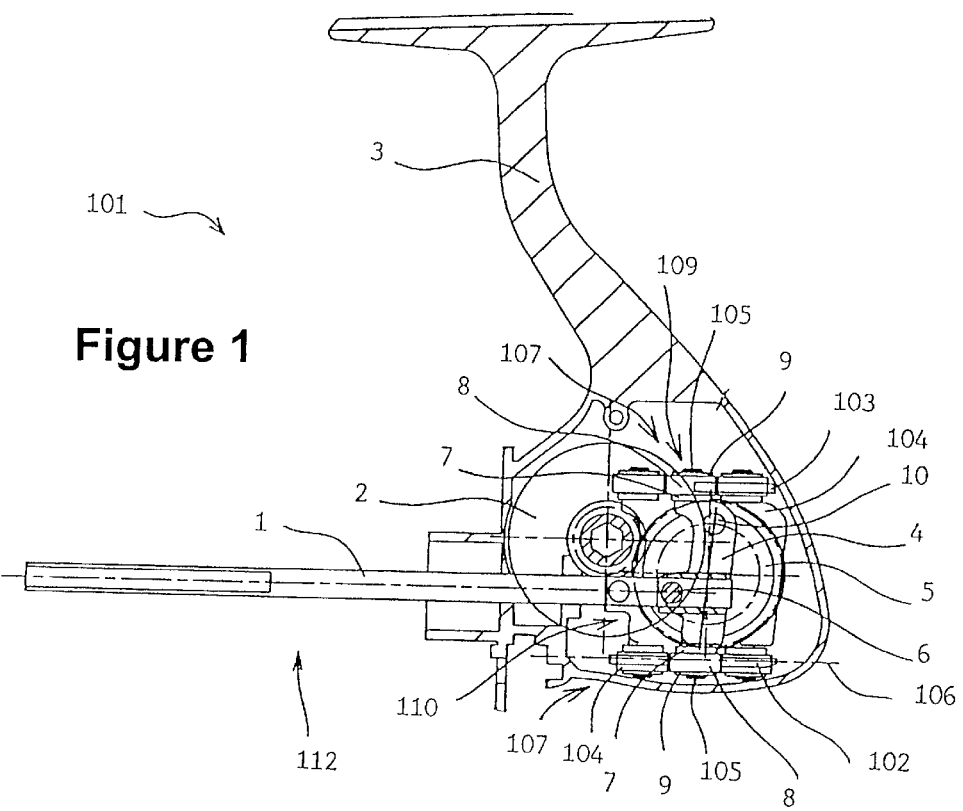
FIG. 1 is a cross sectional view from the side, partly in phantom, of a spinning fishing reel having a guiding mechanism in accordance with the present invention.

With reference to the drawings wherein like numerals represent like parts throughout the several figures, a guiding mechanism in accordance with the present invention is generally designated by the numeral 107. Guiding mechanism 107 functions to reduce frictional resistance associated with guiding fishing reel structures such as the level wind bracket during oscillation of those structures during reel operation.

One type of fishing reel that incorporates the invention is a spinning type fishing reel with a rotor mechanism well known in the art. The reel has a body 3 which encases an oscillation mechanism 110. The level wind gear 5 of the oscillation mechanism is driven by a drive gear 2. The level wind gear and the drive gear may interact through such things as gear teeth, frictional surfaces, or through an intermediary component. A level wind bracket 4 is moved in a fore and aft linear direction as shown by the FIG. 2 arrows, while being guided by the guiding mechanism 107. A pole device 10 is in mechanical contact with and is used to transmit and convert a rotational motion from the level wind gear to the fore and aft linear motion of the level wind bracket.

Locations 104 show several positions of the level wind bracket along various points of the fore and aft linear path. A locking device 6 may be used to affix a shaft 1 to the level wind bracket.

In one embodiment of the invention, a fishing reel 101 contains a guiding mechanism 107 which includes roller assemblies 109 running on runways 102 and 103. The assemblies include a roller and the assembly is mounted on a roller mount 105 which is attached to the bracket. (FIGS. 3–6.) The roller is kept in position by a clip washer 9. In addition, washers 7 may be used to separate the roller from the level wind bracket. In some cases the rollers may be rotatable bearings mounted to the level wind bracket, wherein the mount has a rotatable bearing retention assembly well known in the art. The rotatable bearings may be spherical, cylindrical, tapered, or other geometric shape well known in the roller bearing arts. Runways 102 and 103 are disposed on the body 3 and a runway 320 may in addition be located on the cover 11 (FIG. 2) above the roller. The runway length may be shorter than the stroke of the roller mechanism, allowing the roller to run out of the runway during a portion of the reel operation.

Figure 2:
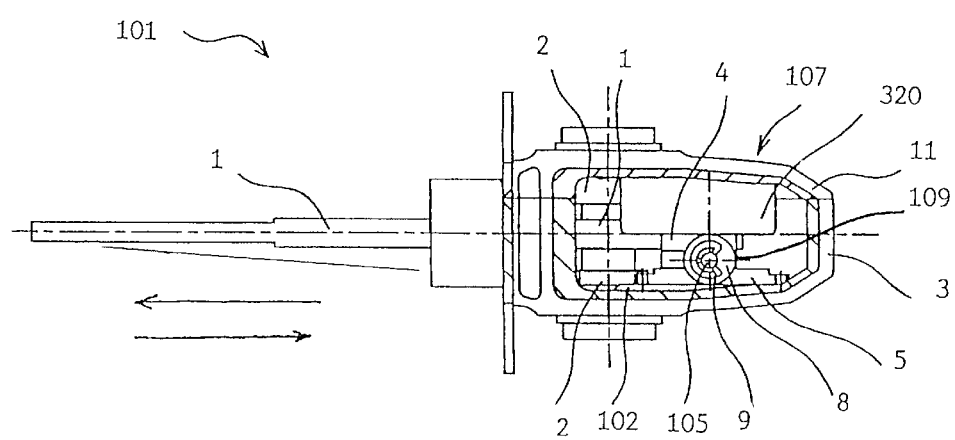
FIG. 2 is a fragmentary cross sectional view from below, partly in phantom, of a spinning fishing reel in accordance with the present invention.

With reference to FIG. 2 showing a bottom view 112 of the fishing reel 101, in one embodiment of the invention there may be two sets of runways. Each set having a runway 320 on the cover 11 above the roller and a runway 102 below the roller. the lower runway may be attached to or part of the body 3. The distance between the runways allows the guiding mechanism 107 to pass without seizing, with the distance being slightly larger than the diameter of the roller. The roller during operation of the reel will often touch only one of the two runways at any given time. However, in some events the roller may touch or be separate from both runways.

Figure 3:
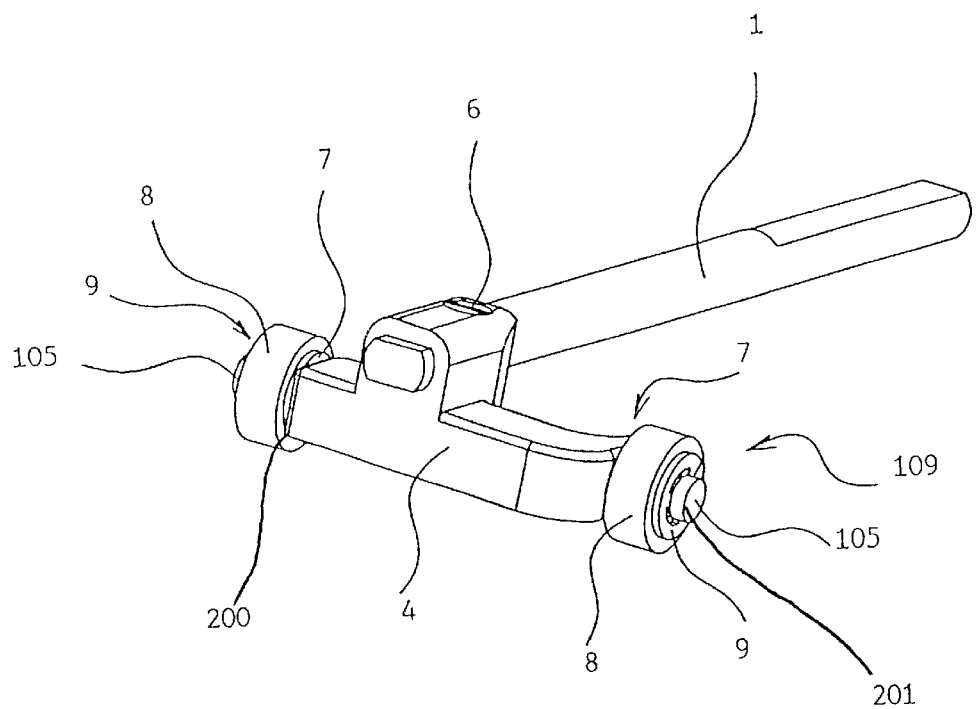
FIG. 3 is a perspective view of a level wind bracket with a fixed shaft and roller assembly consistent with the present invention.

With reference to FIG. 3, the shaft 1 may be affixed onto the level wind bracket by the locking device 6. The level wind bracket has a roller mount with a shoulder 200 and retention end 201. The roller assemblies 109 are positioned on opposing sides of the level wind bracket. The roller of each assembly is held on the mount, with one side of the roller next to the shoulder and the other side of the roller next to the retention end. A washer 7 may be present to separate the roller from the shoulder, and a clip washer 9 may be affixed to the retention end to keep the roller and washer from coming off the roller mount.

Figure 4:
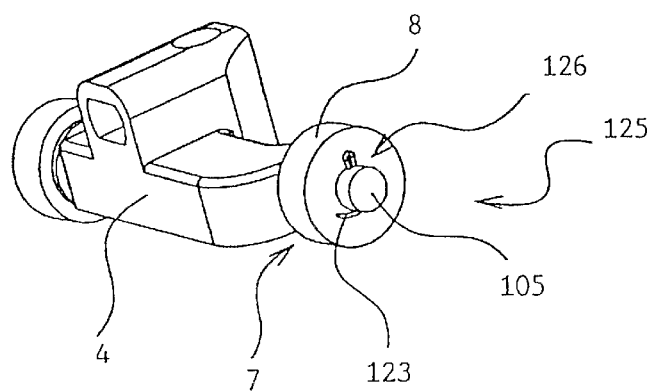
FIG. 4 is a perspective view of a level wind bracket with a roller assembly utilizing retaining pins consistent with the present invention.

With reference to FIG. 4 in an embodiment of the invention, the roller is set on the roller mount 105 of the level wind bracket. A washer 7 is used to separate the roller from the level wind bracket. A locking pin 123 extends through a bore 126 in the retention end of the roller mount and keeps the roller on the roller mount. The locking pin of the roller assembly may be any of a variety of pins such as a Kotter pin, stake pin or roll pin.

Figure 5:
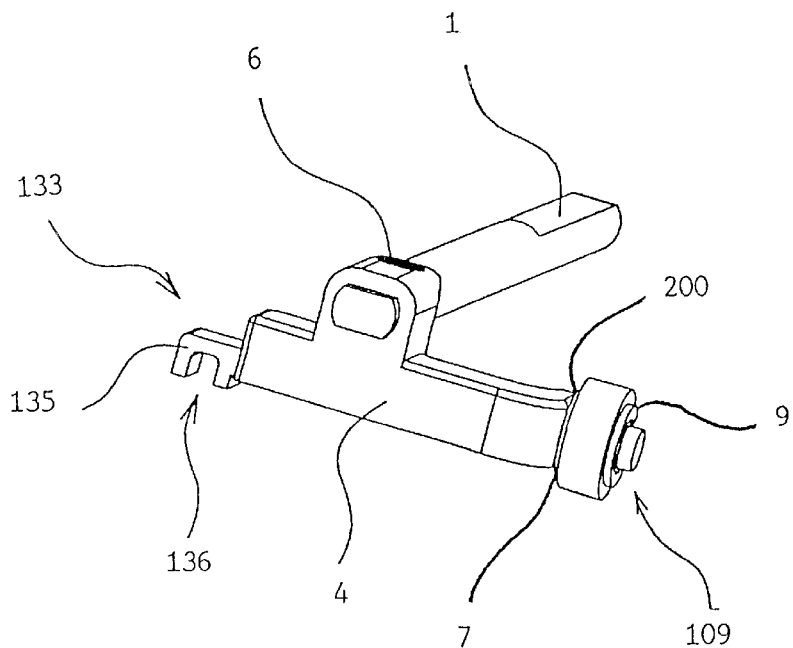
FIG. 5 is a perspective view of a level winding bracket with shaft and a roller assembly and a pawl with groove guide surface.

With reference to FIG. 5, an embodiment of the invention has a shaft which is affixed onto the level wind bracket by a locking device. A roller assembly 109 is mounted to a roller mount on a side of the level wind bracket. A pawl 135 is disposed on the other side of the level wind bracket. A slot 136 in the pawl is configured to slide along and be guided by a block that is attached to the body or the cover of a fishing reel.

Figure 6:
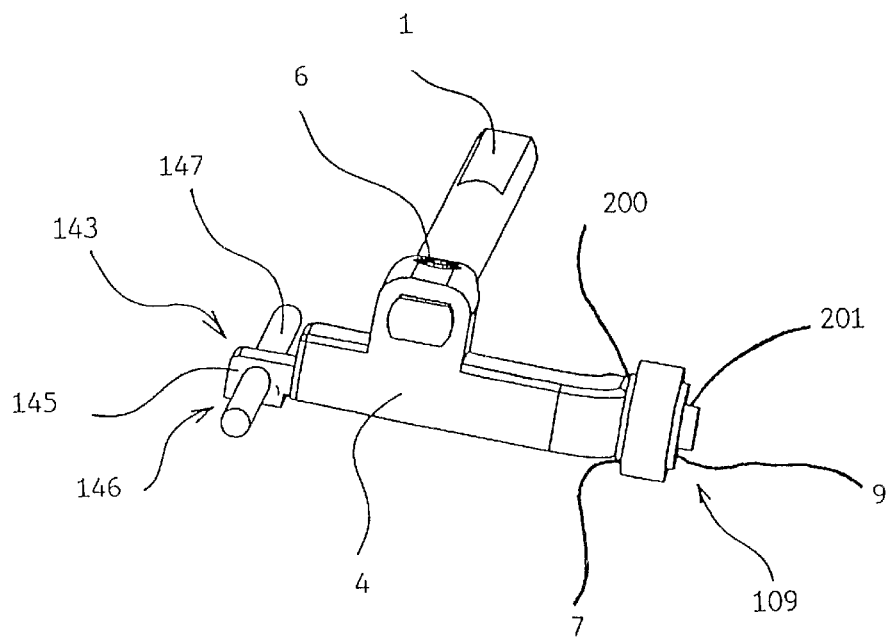
FIG. 6 is a perspective view of a level wind bracket with a shaft and a roller assembly and a hole and rod guide surface consistent with the present invention.

With reference to FIG. 6, an embodiment of the invention has a shaft affixed to the level wind bracket by a locking device. A roller assembly 109 is located on a side of the level wind bracket, a flange 145 is located on the other side of the level wind bracket. A bar 147 attached the body of the fishing reel passes through a hole 146 in the flange and guides the movement of the level wind bracket in conjunction with the roller assembly.

Figure 7:
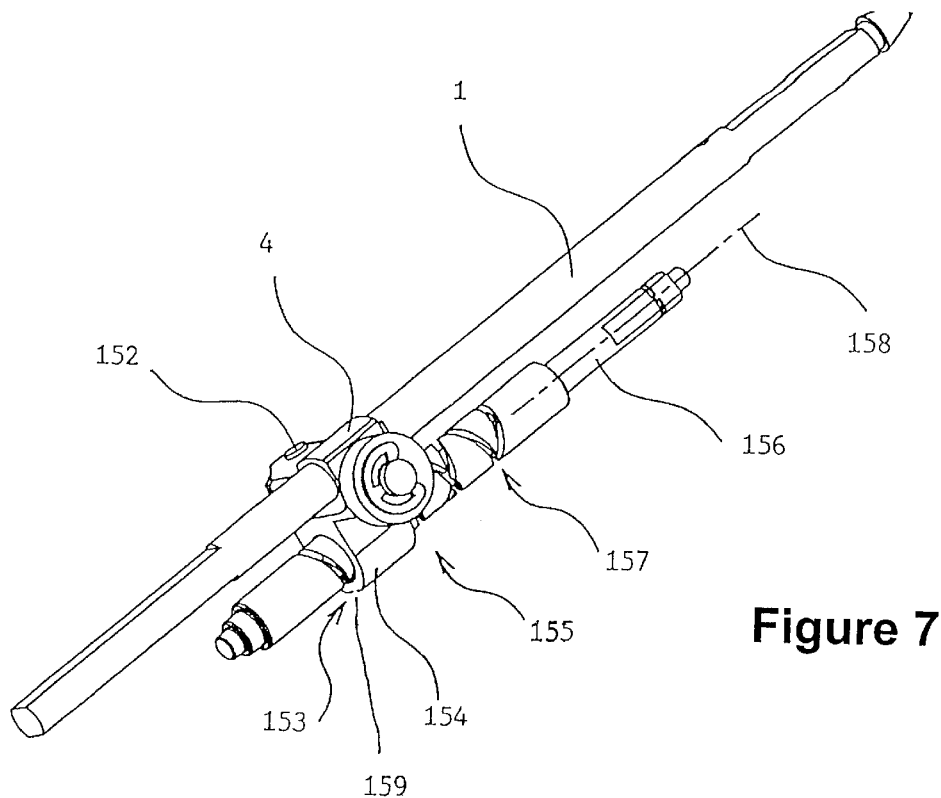
FIG. 7 is a perspective view of a level wind guide with a shaft, a roller assembly utilizing a shuttle screw as the oscillation mechanism consistent with the present invention.

With reference to FIG. 7 in an embodiment of the invention, a closed looped groove 157 is provided on a surface of a shuttle screw 156. The shuttle screw 156 passes through a hole 159 on the level wind bracket. A follower 152 has a pin that follows the grooves of the shuttle screw. A locking device locks the shaft to the level wind bracket and prevents the follower 152 from disengaging. Both ends of the shuttle screw are fitted to the body of the fishing reel and the shuttle screw can only rotate along the shuttle screw axis 158. The fore and aft linear direction shown by FIG. 2 arrows of the level wind bracket is guided by the shuttle screw and a roller assembly 109. The roller of the roller assembly interacts with a runway or set of runways.

Figure 8:
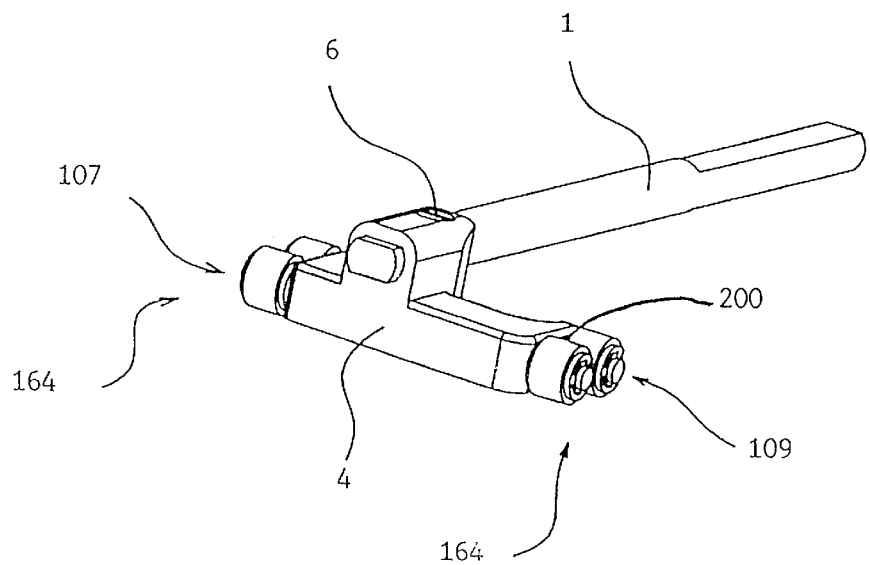
FIG. 8 is a perspective view of a level wind bracket with a fixed shaft and with pairs of roller assemblies consistent with the present invention.

In reference to FIG. 8 in another embodiment of the invention, shaft is affixed to a level wind bracket by a locking device. There are four roller assemblies 109 present. The roller assemblies are present in tandem configuration 164 on opposing sides of the level wind bracket. The rollers of the roller assemblies interact with a runway or set of runways.

Figure 9:
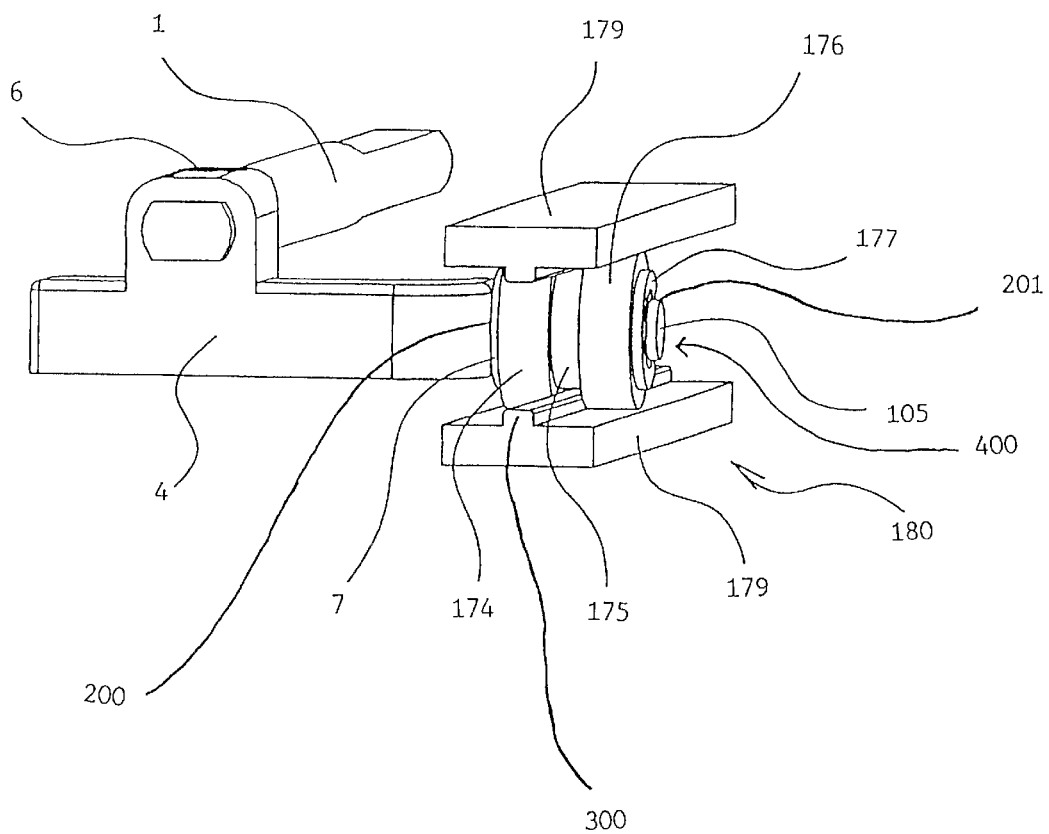
FIG. 9 is a perspective view of a level wind bracket with a fixed shaft and a tandem roller assembly along with associated spaced track pairs consistent with the present invention.

With reference to FIG. 9, in another embodiment of the invention a shaft is affixed to a level wind bracket by a locking device. A roller assembly 400 is attached on a side of the level wind bracket. The wind bracket has an attached roller mount 105. The roller mount has a shoulder 200 and a retention end 201. The roller assembly contains two rollers 174, 176, which are positioned next to one another. A washer 175 is positioned between the two rollers and is of a diameter that is less than the diameter of the rollers. The differential in diameters creates a groove between the rollers. This groove cooperates with a ridge 300 (partially illustrated) formed along the inside surface of each runway. The rollers travel on the runways of the fishing reel, with the ridge and groove configuration controlling the level wind bracket during fore and aft linear movement.

Figure 10:
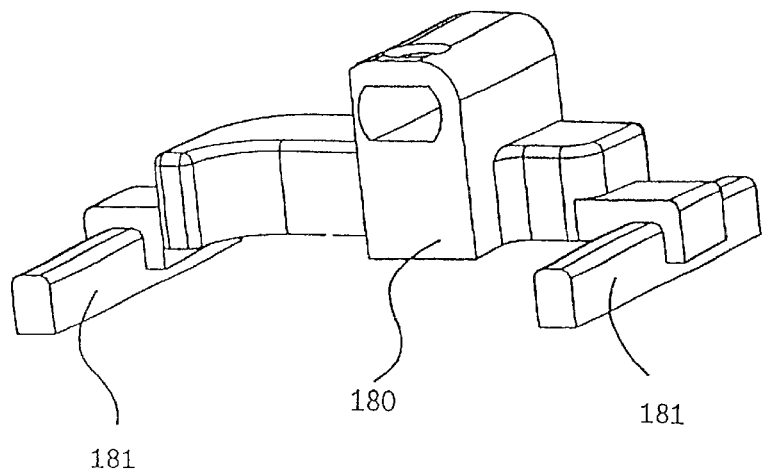
FIG. 10 is a perspective view of a prior art pawl and groove guide device.
Figure 11:
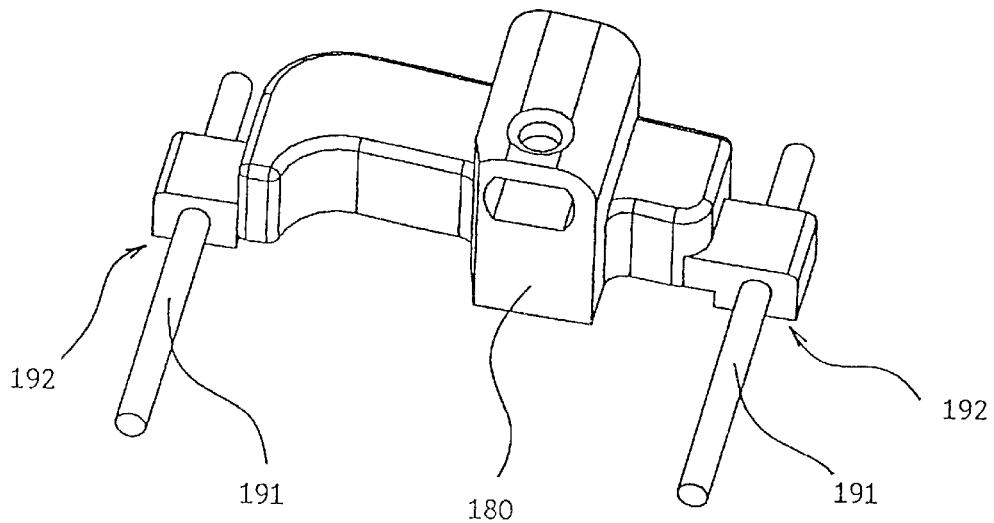
FIG. 11 is a perspective view of a prior art rod and hole guiding device.

The invention may be appreciated by reference to FIGS. 10 and 11 which depicts prior art guiding mechanisms. In the Figures a bracket 180 is guided by sets of blocks 181 or bars 191. The set of bars 191 extends through sets of bores 192. It should be appreciated that the invention incorporates a new and improved guiding mechanism which operates within the confines of a fishing reel.

While the preferred embodiments have been to describe the invention, various modifications and substitutions may be made thereto without departing from the spirit and scope of the invention. Accordingly, it is to be understood that the present invention has been described by way of illustration and not limitation.

What is claimed is:

1. A guiding mechanism for a fishing reel comprising:
   a level wind bracket in operative communication with a reel driving mechanism for displacement of the level wind bracket, said level wind bracket having a shaft mount configured to receive a shaft and defining a central axis;
   a roller mount fixed to the level wind bracket;
   a roller assembly having a roller rotatably mounted to the roller mount, said roller having a rotational axis which is perpendicular to the central shaft axis; and
   a roller runway in mechanical association with said roller.

2. The guiding mechanism of claim 1, wherein the level wind bracket is in operative communication with an oscillation gear.

3. The guiding mechanism of claim 1, wherein the level wind bracket is in operative communication with a shuttle screw.

4. The guiding mechanism of claim 1, wherein the level wind bracket has a guide surface, and said shaft mount is disposed intermediate the guide surface and the roller mount.

5. The guiding mechanism of claim 4, wherein the guide surface is defined by a pawl.

6. The guiding mechanism of claim 4, wherein the guide surface defines an opening configured to receive a bar.

7. The guiding mechanism of claim 1, wherein the level wind bracket has a set of two roller mounts on each opposing side of the level wind bracket, said shaft mount being disposed intermediate the two sets of two roller mounts.

8. The guiding mechanism of claim 1, wherein the roller mount has a shoulder and a retention end.

9. The guiding mechanism of claim 8, wherein the roller assembly comprises a washer abutting the interior shoulder, a roller abutting the washer, and a clip washer abutting the roller said clip washer affixed to the retention end.

10. The guiding mechanism of claim 8, wherein the roller assembly comprises a first washer abutting the interior shoulder, a first roller, a second washer abutting the first roller, a second roller abutting the second washer, said first and second rollers having a diameter larger than the second washer, and a clip washer abutting the second roller, said clip washer affixed to the retention end.

11. The guiding mechanism of claim 10, wherein the roller runway comprises a set of spaced opposing elongated rails having a top rail and a bottom rail, said top and bottom rails have a ridge disposed along an inside length, said ridge is configured to engage a space between the first and second rollers created by the second washer.

12. The guiding mechanism of claim 1, wherein the roller runway is in intermittent contact with the roller during displacement of the level wind bracket.

13. A guiding mechanism for a fishing reel comprising:
a level wind bracket;
a shaft mount disposed on the level wind bracket and configured to receive a shaft and defining a central shaft axis;
a roller mount fixed to the level wind bracket;
a roller assembly means for linear displacement of the level wind bracket parallel to the shaft central axis; and
a roller runway means for mechanical association with said roller assembly.

* * * * *